United States Patent [19]

Farmer

[11] Patent Number: 4,475,385
[45] Date of Patent: Oct. 9, 1984

[54] MODEL MOUNT SYSTEM FOR TESTING FLUTTER

[75] Inventor: Moses G. Farmer, Hampton, Va.

[73] Assignee: The United States of America as represented by the Administrator of the National Aeronautics and Space Administration, Washington, D.C.

[21] Appl. No.: 481,106

[22] Filed: Mar. 31, 1983

[51] Int. Cl.³ .............................................. G01M 9/00
[52] U.S. Cl. ....................................................... 73/147
[58] Field of Search ......................... 73/147, 856, 180

[56] References Cited

U.S. PATENT DOCUMENTS

| | | | |
|---|---|---|---|
| 2,331,304 | 10/1943 | Carmody | 73/147 |
| 2,358,931 | 9/1944 | Kahlow | 73/147 |
| 2,380,516 | 7/1945 | Goldberg | 73/147 |
| 2,711,648 | 6/1955 | Carlstrand et al. | 73/147 |
| 2,795,137 | 6/1957 | Whitener | 73/147 |
| 2,909,061 | 10/1959 | Gelbach et al. | 73/147 |
| 3,455,155 | 7/1969 | Greenberg et al. | 73/147 |
| 3,869,909 | 3/1975 | Hale et al. | 73/147 |
| 4,107,986 | 8/1978 | Jones | 73/147 |

Primary Examiner—Donald O. Woodiel
Attorney, Agent, or Firm—Howard J. Osborn; John R. Manning; Gene E. Shook

[57] ABSTRACT

This invention is a wind tunnel model mount system (10) for effectively and accurately determining the effects of angle of attack and airstream velocity on a model airfoil or aircraft. The model mount system includes a rigid model (30) attached to a splitter plate (11) which is supported away from the wind tunnel wall (20) by a plurality of flexible rods (12). Conventional instrumentation (21) is employed to effect model rotation through turntable (13) and to record model (30) flutter data as a function of the angle of attack versus dynamic pressure.

17 Claims, 9 Drawing Figures

MODEL MOUNT SYSTEM FOR TESTING FLUTTER

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates to a wind tunnel model mount system and more particularly to a flexible structure mount system for effectively and accurately determining the effects of angle of attack and airstream velocity on the flutter of a model aircraft or airfoil. More particularly, the angle of attack of a wind tunnel model and the airstream velocity are varied until the model experiences sustained sinusoidal flutter.

Flutter is the self-excited oscillation of an elastic body such as an aircraft wing, fuselage, empennage etc. in an airstream and may result in catastrophic structural failure. Flutter of an airfoil generally comprises pitch motion, the oscillatory rotation of the airfoil about its lateral axis, and plunge motion, the oscillatory vertical translation of the airfoil in a direction perpendicular to its chordline. The aerodynamic forces that are responsible for flutter motion are caused principally by the oscillatory aeroelastic deformation of the structure. For a particular structure, flutter motion depends on the mass and stiffness properties of the structure, the geometric shape and angle of attack, and the velocity and density of the airstream.

Flutter is a complex phenomenon and analytical methods to predict flutter are not sufficiently accurate; therefore, most flutter research is conducted experimentally in wind tunnels. To conduct basic wind tunnel flutter studies, it is desirable to use models which are as simple as practical yet still represent the important flutter parameters. A model mount system which provides for only pitch and plunge degress of freedom meets this requirement for many research studies. This is because the flutter characteristics of a rigid wing with only pitch and plunge degrees of freedom are very similar to the flutter characteristics of flexible wings which have very complex degrees of freedom. Such a model mount system must be strong enough to carry large steady state and dynamics loads. Previously, such model mount systems employed bearings and linkages which made the systems complex, unwieldy, and expensive to fabricate. Moreover, the bearings or linkages supporting the model inherently introduce undesirable damping which can change unpredictably as the load on the model changes especially at high airstream velocities and angles of attack, thereby inaccurately simulating the flutter motion of the structure. Attempts to obtain accurate test data by subtracting out the damping error or by ignoring it have proved laborious and inaccurate.

Accordingly, it is an object of the present invention to provide an improved wind tunnel model mount system with new and novel apparatus for supporting the model in the airstream and designed to accurately simulate the flutter motion of airfoils and aircraft, thereby enabling the design of an airfoil or aircraft which will not suffer catastrophic structural failure.

A further object of the invention is to provide a model mount system which, in combination with airflow within the wind tunnel and the model airfoil or aircraft, accurately simulates flutter oscillations at varying angles of attack and airstream velocities.

Another object is to provide a means for adjusting the model angle of attack.

A further object is to provide a model mount system which can carry large, steady-state and dynamic loads and includes linear elastic constraints to simulate pitch and plunge oscillations at high airstream velocities and which is insensitive to forces other than aeroelastic deformation.

Still another object is to provide a model mount system which may be used and adapted to a variety of aircraft and airfoil models including supercritical airfoils.

Yet another object is to provide a model mount system with a small amount of damping of the flutter oscillations.

Still another object is to provide a model mount system which is simple, lightweight, durable and inexpensive to fabricate.

Another object is to provide a system which employs a rigid airfoil or aircraft model with flexible supports that extend away from the wind tunnel wall and into the main airstream.

SUMMARY OF THE INVENTION

These and other objects of the invention are achieved by providing a wind tunnel model mount system for measuring flutter and including a rigid model attached to a splitter plate which is supported away from the wind tunnel wall by a plurality of flexible rods. The flexible rods are constructed and oriented to permit only the pitch and plunge oscillations which are characteristic of flutter. At the tunnel wall the rods are affixed to a remotely controlled turntable to enable adjustments in the angle of attack of the model.

BRIEF DESCRIPTION OF THE DRAWINGS

A more complete appreciation of the invention and the attendant advantges thereof will become more apparent by reference to the following description when considered in connection with the accompanying drawings, wherein.

DETAILED DESCRIPTION OF THE INVENTION

Figure 1:
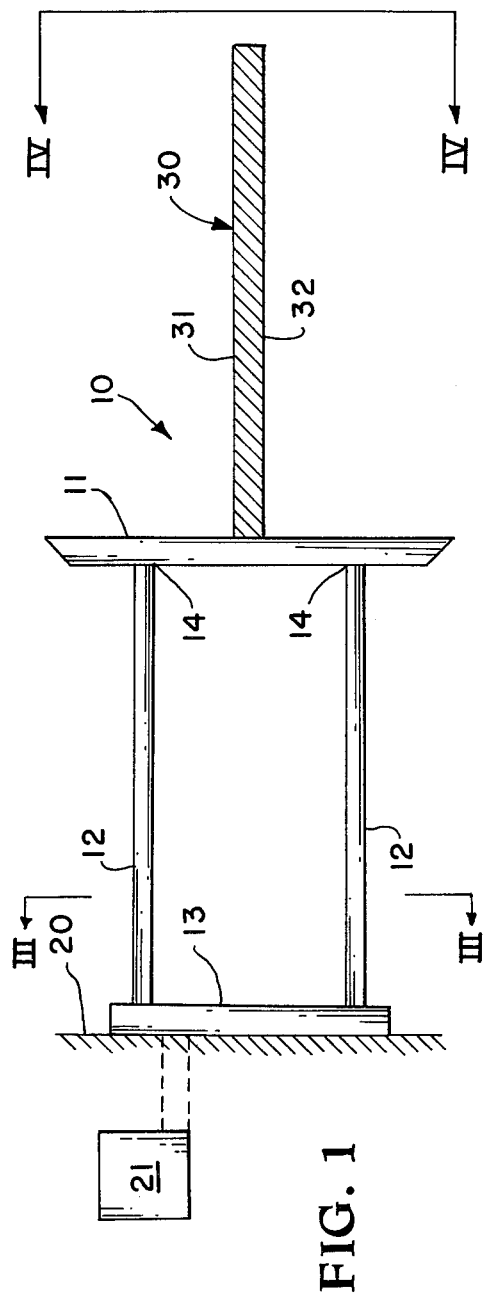
FIG. 1 is a part sectional, horizontal view looking upstream relative to the wind tunnel airflow and illustrating the preferred embodiment of the mount system of the present invention.

With reference to FIG. 1, a wind tunnel model mount system incorporating the principles and features of the present invention and designated generally by reference numeral 10 is illustrated. FIG. 1 is a horizontal view looking upstream relative to the wind tunnel airflow. The wind tunnel model mount system 10 comprises a rigid model wing 30 with an upper surface 31 and lower surface 32 and extending horizontally into the main airstream of the wind tunnel. The model wing 30 may be fabricated from metal, wood, fiber reinforced composite or any other suitable conventional material which is substantially rigid. The model wing 30 is rigidly affixed to a splitter plate 11, so that the model wing 30 and the splitter plate 11 move together as one rigid mass. The model wing 30 may be bolted, welded or otherwise conventionally affixed to the splitter plate 11. The splitter plate 11 is oriented parallel to the wind tunnel wall 20 by flexible rods 12. The flexible rods 12 may be fabricated from metal, wood, fiber reinforced composite or any other suitable conventional material which is substantially flexible and can support large steady state and dynamic loads. In the preferred embodiment, the flexible rods are fabricated from heat treated stainless steel to obtain an ultimate yield stress of 160,000 psi and are 0.625 inches in diameter. One end of each flexible rod 12 is rigidly affixed to the splitter plate 11 at points 14 and the rods are equally spaced along the circumference of a circle. At the wind tunnel wall 20, the ends of the flexible rods 12 are rigidly affixed to a remotely controlled turntable 13, which is mounted in the wind tunnel wall 20 and may be rotated to vary the angle of attack of the model wing 30 in the airstream. In the preferred and illustrated embodiment, the ends of the flexible rods 12 are threaded and screwed into threaded, tapped holes in each the splitter plate 11 and the remotely controlled turntable 13; however, the flexible rods 12 may be bolted, welded or otherwise conventionally affixed to the splitter plate 11 and the remotely controlled turntable 13. In addition, in the preferred and illustrated embodiment, the remotely controlled turntable 13 is mounted flush to the wind tunnel wall 20 to form a smooth, uniform surface. The turntable 13 is remotely operated by suitable conventional wind tunnel instrumentation designated by reference numeral 21. The instrumentation 21 further includes any necessary recording devides. In the interest of clarity, the instrumentation 21 is not designated hereinbelow; however, it should be understood that suitable conventional wind tunnel instrumentation in employed throughout the following descriptions.

Figure 2:
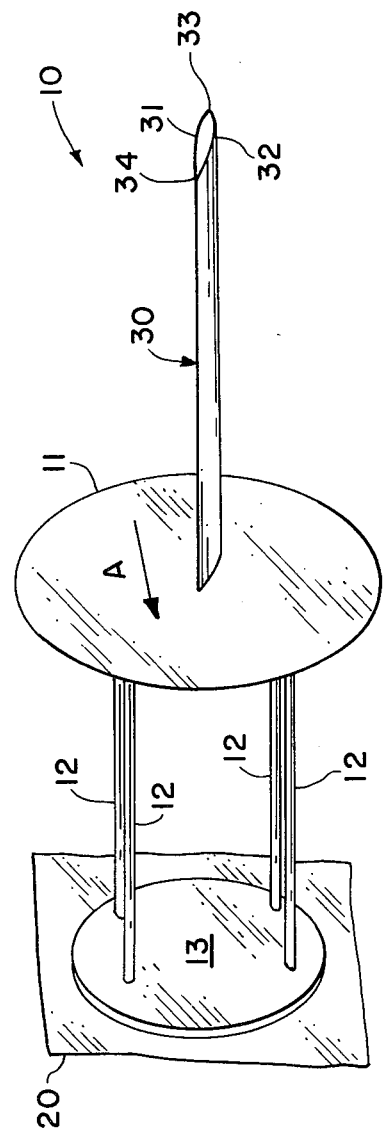
FIG. 2 is a perspective view of the mount system and model wing shown in FIG. 1.

FIG. 2 is a perspective view of the apparatus shown in FIG. 1. The wind tunnel model mount system 10 includes a rigid model wing 30 with an upper surface 31, lower surface 32, leading edge 33 and trailing edge 34. The direction of the airflow is designated by arrow A. The model wing 30 is rigidly affixed to splitter plate 11. The splitter plate 11 is supported away from the wind tunnel wall 20 by a plurality of flexible rods 12. The preferred and illustrated embodiment utilizes four flexible rods 12 of equal diameter to each other. At the wind tunnel wall 20, the flexible rods are rigidly affixed to a remotely controlled turntable 13 which is mounted in the wind tunnel wall 20. In the interest of clarity, the instrumentation is not designated in FIG. 2, but it should be understood that the turntable 13 is controlled from a remote source.

Figure 3:
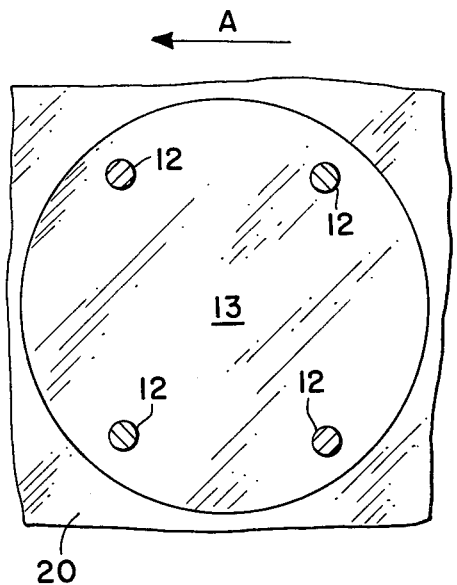
FIG. 3 is a sectional view taken along line III—III of FIG. 1.

FIG. 3 is a sectional view taken along line III—III of FIG. 1 showing the flexible rods 12 affixed to the remotely controlled turntable 13 which is mounted in the wind tunnel wall 20. Arrow A indicates the direction of the air flow.

Figure 4:
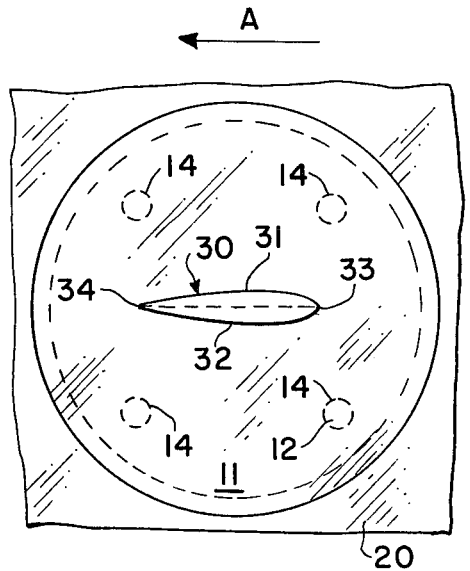
FIG. 4 is an end view taken along line IV—IV of FIG. 1, showing the splitter plate and model wing.

FIG. 4 is a sectional view taken along line IV—IV of FIG. 1 showing the sectional airfoil of model wing 30 affixed to the splitter plate 11. Model wing 30 has an upper surface 31, lower surface 32, leading edge 33 and trailing edge 34. The flexible rods are affixed to the back of the splitter plate 11 at points 14 (dashed lines).

Figure 5:
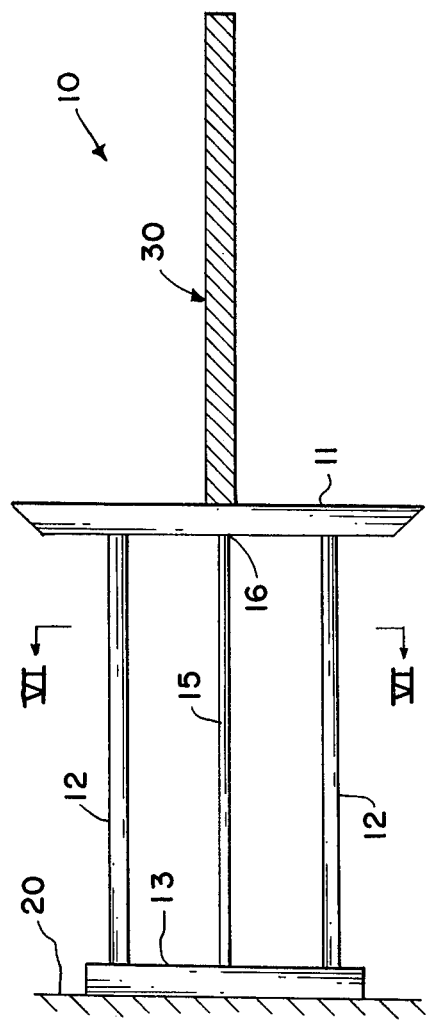
FIG. 5 is a part sectional, horizontal view looking upstream relative to the wind tunnel airflow of an alternate embodiment of the invention employing a drag strut.

FIG. 5 is a view similar to FIG. 1 and illustrating an alternate embodiment of the invention wherein the splitter plate 11 and associated model wing 30 are supported away from the wind tunnel wall 20 by flexible rods 12 and a drag strut 15. The drag strut 15 is rigidly affixed to the splitter plate 11 at point 16.

Figure 6:
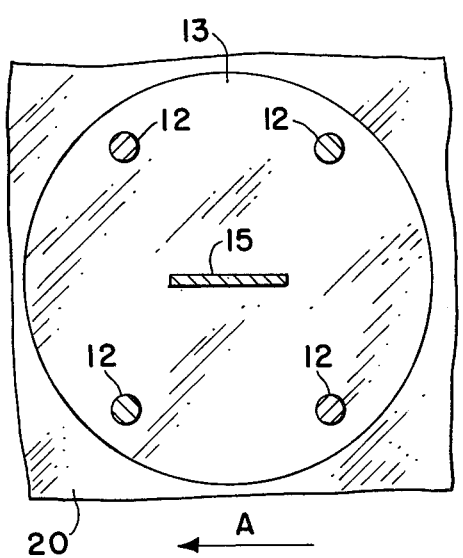
FIG. 6 is a sectional view of this alternate embodiment taken along line VI—VI of FIG. 5.

FIG. 6 is a sectional view taken along line VI—VI of FIG. 5. The drag strut 15 is rigidly affixed to the remotely controlled turntable 13 and may be fabricated from metal, wood, fiber reinforced composite or other suitable materials. The drag strut 15 is oriented to increase the horizontal translational stiffness of the support system, thereby making the stiffness of the model support system 10 in the direction perpendicular to the direction of plunge much greater than the stiffness in the plunge direction. The contribution of the drag strut 15 to the pitch and plunge stiffness of the system is much less than the contribution of the flexible support rods 12. In the illustrated embodiment, the drag strut 15 has a rectangular cross-section measuring 0.25×3 inches, is fabricated from carbon steel and the drag strut 15 ends are bolted to the center of the remotely controlled turntable 13 and splitter plate 11, respectively. The drag strut 15 may also be welded or otherwise conventionally affixed to each of the remotely controlled turntable 13 and the splitter plate 11.

Figure 7:
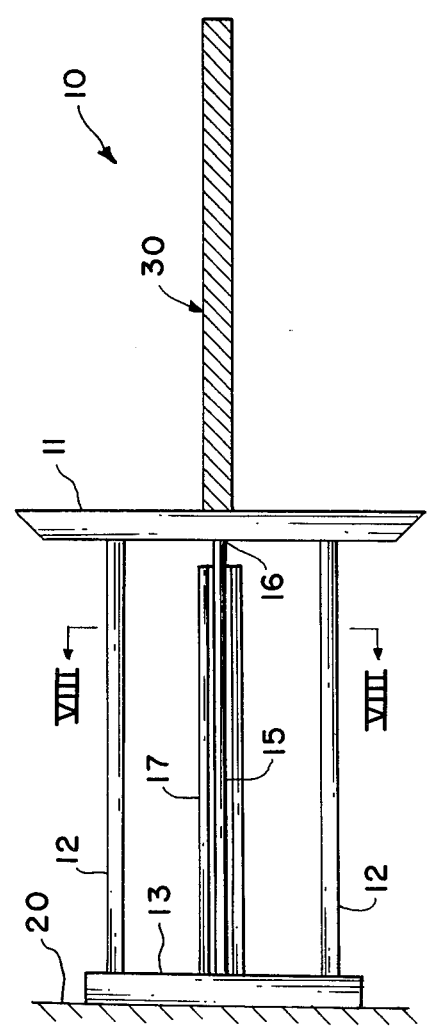
FIG. 7 is a part sectional, horizontal view looking upstream relative to the wind tunnel airflow similar to FIG. 5 and further showing a wind screen.

FIG. 7 illustrates an alternate embodiment of the invention shown in FIGS. 5 and 6, wherein a wind screen 17, fabricated from solid sheet metal or other suitable material, envelopes the drag strut 15 (dashed lines). Wind screen 17 is bolted or otherwise conventionally attached to the remotely controlled turntable 13 and extends adjacent to but not in contact with the splitter plate 11.

Figure 8:
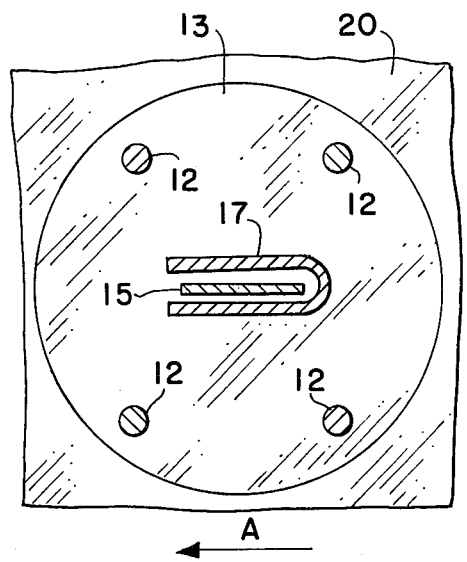
FIG. 8 is a sectional view taken along line VIII—VIII of FIG. 7.

FIG. 8 is a sectional view taken along line VIII—VIII of FIG. 7. The wind screen 17 is not involved in the support system and is generally U-shaped to prevent air flow, designated by arrow A, over the drag strut which might contribute to undesirable aerodynamic damping.

The operation of the invention is now believed apparent. The flexible rods are rigidly affixed to both the turntable 13 and splitter plate 11 so that each end of each rod is in a fixed condition. Because the fixed ends of the rods are prevented from moving longitudinally, no roll or yaw deflection of the splitter plate 11 occurs. Consequently, the plane of the splitter plate 11 remains parallel to the plane of the tunnel wall. Roll and yaw moments are carried by axial compression and tension loads on the rods 12, and the support system only moves in pitch and plunge oscillations which is characteristic of flutter. The flutter characteristics of a rigid wing 30 with pitching and plunging degrees of freedom are qualitatively very similar to the flutter characteristics of more complex flexible wings with bending and torsion structural modes. The pitch and plunge stiffnesses may be controlled by selecting flexible rods with a particular bending spring constant and torsion spring constant, respectively. Accordingly, the mount system has natural pitch and plunge frequencies that may be calculated from the spring constants of the rods and the mass and inertia properties of the splitter plate and model.

Figure 9:
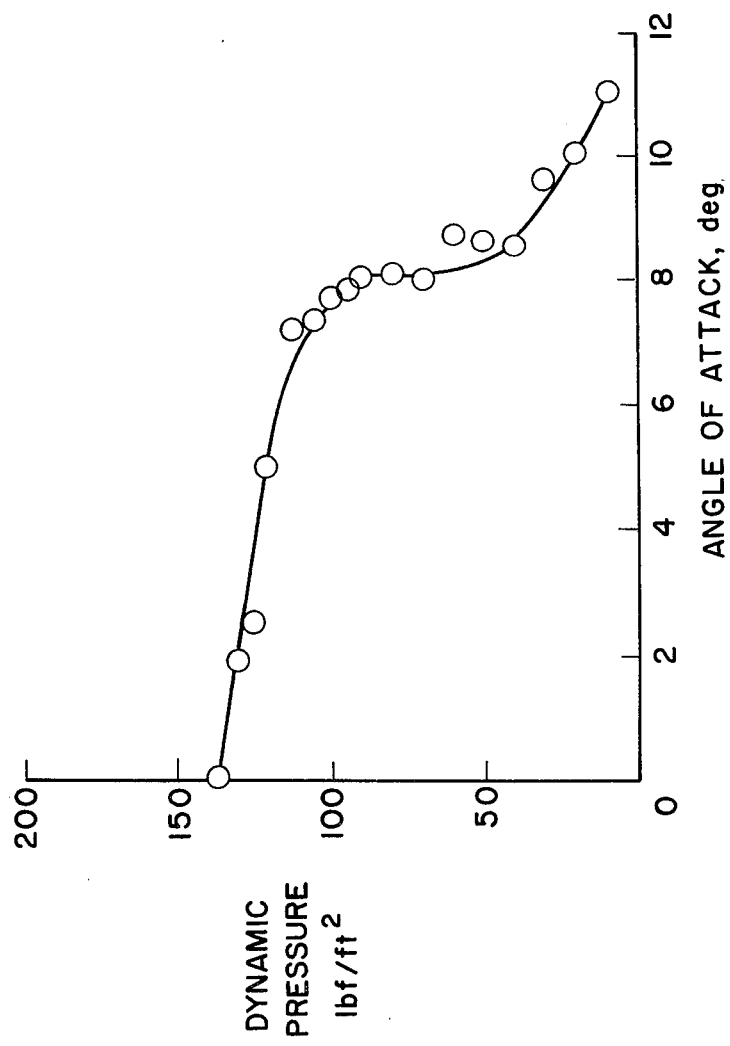
FIG. 9 is a plot of angle of attack versus dynamic pressure showing the points of sustained sinusiodal flutter for a conventional airfoil.

In operation, the angle of attack of the model wing 30 is varied by rotating the remotely controlled turntable 13. The true angle of attack may be obtained from an angle of attack accelerometer mounted on the model wing 30 or splitter plate 11. The true angle of attack may differ from the value obtained at the turntable position due to the steady-state aerodynamic forces on the airfoil which cause the mount system to deflect in pitch. The oscillatory motion of the model wing may be sensed by accelerometers mounted on the model wing 30 or splitter plate 11 and by strain gages mounted on the flexible support rods 12. In a specific test situation, the operator would rotate the model wing 30 to a given angle of attack and record the frequency and magnitude of the pitch oscillation and the plunge oscillation for different airstream velocities. Generally, the operator continues to vary the angle of attack and the airstream velocity until a sustained sinusoidal flutter is observed. FIG. 9 is a plot of angle of attack versus dynamic pressure, which is a function of the square of the airstream velocity, for a conventional airfoil at subsonic Mach numbers. The circles represent the points at which sustained sinusoidal flutter of the model airfoil were observed, and each data point was obtained by first establishing tunnel flow conditions and then increasing the angle of attack until sinusoidal flutter occurred. The plot illustrates that the critical angle of attack for this airfoil is about 8 degrees.

It is seen than that this invention operates to effectively and accurately determine the effects of angle of attack and airstream velocity on the flutter oscillations of a model wing or aircraft in a wind tunnel without the undesirable characteristics of prior art mount systems. The invention model mount system has new and novel structure including flexible rods and a rigid model for determining flutter with a small amount of aerodynamic damping.

It is to be understood that the forms of the invention shown are merely preferred embodiments and various changes can be made in the shape, size and arrangement of the model mount system as will be readily apparent to those skilled in the art. For example, one skilled in the art may employ any number of flexible rods 12 of varying diameters in order to achieve the desired support characteristics. In addition, the wind tunnel model mount system may extend vertically, as well as horizontally, into the main airstream of the wind tunnel, and may utilize a model aircraft, as well as a model airfoil. Also, additional wind screens or fairings may be employed for rods 12 and splitter plate 11 and certain parts may be used independently from other features described herein without departing from the spirit and scope of the invention described herein.

What is claimed as new and desired to be secured by Letters Patent of the United States is:

1. A wind tunnel model mount system for testing flutter, comprising:
   a wind tunnel with walls;
   a rigid model;
   flexible support means affixed to and extending from one of said wind tunnel walls for supporting said rigid model in an airstream and limiting the motion of said rigid model to pitch and plunge oscillations characteristic of flutter.

2. A wind tunnel model mount system for testing flutter as in claim 1, further comprising:
   means for adjusting the angle of attack of said rigid model in said airstream.

3. A wind tunnel model mount system for testing flutter as in claim 2, wherein said means for adjusting the angle of attack is a remotely controlled turntable mounted in said wind tunnel wall and said flexible support means is affixed to and extending from said remotely controlled turntable.

4. A wind tunnel model mount system for testing flutter as in claim 1, further comprising:
   a splitter plate with a first surface and a second surface, disposed between said flexible support means and said rigid model and wherein said rigid wing is rigidly affixed to said first surface of said splitter plate and said flexible support means is rigidly affixed to said second surface of said splitter plate.

5. A wind tunnel model mount system for testing flutter as in claim 4, wherein said splitter plate is oriented parallel to said wind tunnel wall.

6. A wind tunnel model mount system for testing flutter as in claim 4, wherein said flexible support means comprises a plurality of flexible rods.

7. A wind tunnel model mount system for testing flutter as in claim 6, wherein each of said flexible rods is circular and of equal diameter to each other.

8. A wind tunnel model mount system for testing flutter as in claim 6, wherein said plurality of flexible rods are oriented on the circumference of a circle.

9. A wind tunnel model mount system for testing flutter as in claim 6, wherein said plurality of flexible rods consists of four flexible rods.

10. A wind tunnel model mount system for testing flutter as in claim 6, further comprising a remotely controlled turntable for adjusting the angle of attack of said rigid model in said airstream, wherein said remotely controlled turntable is mounted in said wind tunnel wall and said flexible rods are affixed to and extending from said remotely controlled turntable.

11. A wind tunnel model mount system for testing flutter as in claim 6, further comprising a remotely controlled turntable for adjusting the angle of attack of said rigid model in said airstream, wherein said remotely controlled turntable is mounted in said wind tunnel wall and said flexible rods and said drag strut are affixed to and extending from said remotely controlled turntable.

12. A wind tunnel model mount system for testing flutter as in claim 11, wherein one end of said drag strut is affixed to the center of said remotely controlled turntable and the other end of said drag strut is affixed to the center of said splitter plate.

13. A wind tunnel model mount system for testing flutter as in claim 11, wherein said drag strut is rectangular in cross-section.

14. A wind tunnel model mount system for testing flutter as in claim 13, further comprising a wind screen which covers said drag strut to prevent aerodynamic damping due to air flow over said rectangular drag strut.

15. A wind tunnel model mount system for testing flutter as in claim 14, wherein said wind screen is U-shaped.

16. A wind tunnel model mount system for testing flutter as in claim 1, wherein said rigid model is a rigid model wing.

17. A wind tunnel model mount system for testing flutter as in claim 1, wherein said rigid model is a rigid model aircraft.

* * * * *

UNITED STATES PATENT AND TRADEMARK OFFICE
CERTIFICATE OF CORRECTION

PATENT NO. : 4,475,385

DATED : October 9, 1984

INVENTOR(S) : Moses G. Farmer

It is certified that error appears in the above-identified patent and that said Letters Patent is hereby corrected as shown below:

On the title page:
Delete "Gene E. Shook" as an attorney

Add "Wallace J. Nelson" as an attorney

Signed and Sealed this

Second Day of April 1985

[SEAL]

*Attest:*

DONALD J. QUIGG

*Attesting Officer*     *Acting Commissioner of Patents and Trademarks*